US011417327B2

(12) United States Patent
Choi

(10) Patent No.: US 11,417,327 B2
(45) Date of Patent: Aug. 16, 2022

(54) ELECTRONIC DEVICE AND CONTROL METHOD THEREOF

(71) Applicant: Samsung Electronics Co., Ltd., Suwon-si (KR)

(72) Inventor: Chanhee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 291 days.

(21) Appl. No.: 16/697,934

(22) Filed: Nov. 27, 2019

(65) Prior Publication Data

US 2020/0168223 A1 May 28, 2020

(30) Foreign Application Priority Data

Nov. 28, 2018 (KR) ........................ 10-2018-0149304

(51) Int. Cl.
*G10L 15/22* (2006.01)
*G10L 15/187* (2013.01)
(Continued)

(52) U.S. Cl.
CPC ............ *G10L 15/22* (2013.01); *G10L 15/063* (2013.01); *G10L 15/187* (2013.01);
(Continued)

(58) Field of Classification Search
CPC ..... G10L 15/22; G10L 15/063; G10L 15/187; G10L 2015/0635; G10L 2015/088; G10L 2015/223
See application file for complete search history.

(56) References Cited

U.S. PATENT DOCUMENTS 5,832,429 A * 11/1998 Gammel ............... G10L 15/063
704/250
5,842,165 A 11/1998 Raman et al.
(Continued)

FOREIGN PATENT DOCUMENTS

JP 2009-258369 11/2009
JP 5716595 3/2015
(Continued)

OTHER PUBLICATIONS

Form PCT/ISA210; International Search Report dated Feb. 27, 2020 in International Patent Application No. PCT/KR2019/095045.
(Continued)

*Primary Examiner* — Michael Colucci
(74) *Attorney, Agent, or Firm* — Staas & Halsey LLP

(57) ABSTRACT

An electronic apparatus is provided. The electronic device includes: a storage configured to store recognition related information and misrecognition related information of a trigger word for entering a speech recognition mode; and a processor configured to identify whether or not the speech recognition mode is activated on the basis of characteristic information of a received uttered speech and the recognition related information, identify a similarity between text information of the received uttered speech and text information of the trigger word, and update at least one of the recognition related information or the misrecognition related information on the basis of whether or not the speech recognition mode is activated and the similarity.

17 Claims, 9 Drawing Sheets

(51) Int. Cl.

*G10L 15/06* (2013.01)
*G10L 15/08* (2006.01)

(52) U.S. Cl.

CPC ................ *G10L 2015/0635* (2013.01); *G10L 2015/088* (2013.01); *G10L 2015/223* (2013.01)

(56) References Cited

U.S. PATENT DOCUMENTS

| | | | | |
|---|---|---|---|---|
| 6,275,800 | B1 | 8/2001 | Chevalier et al. | |
| 7,487,091 | B2 | 2/2009 | Miyazaki | |
| 8,924,199 | B2 | 12/2014 | Ishikawa et al. | |
| 9,275,637 | B1 | 3/2016 | Salvador et al. | |
| 9,697,822 | B1 | 7/2017 | Naik et al. | |
| 9,870,770 | B2 * | 1/2018 | Bang | H04R 3/005 |
| 10,418,027 | B2 | 9/2019 | Ko et al. | |
| 10,446,141 | B2 * | 10/2019 | Krishnamoorthy | G10L 15/02 |
| 2009/0024392 | A1 | 1/2009 | Koshinaka | |
| 2011/0060587 | A1 * | 3/2011 | Phillips | G10L 15/30 704/235 |
| 2012/0197634 | A1 | 8/2012 | Ishikawa et al. | |
| 2014/0350933 | A1 * | 11/2014 | Bak | G10L 15/1822 704/249 |
| 2016/0027436 | A1 * | 1/2016 | Lee | G10L 15/22 704/236 |
| 2016/0077794 | A1 | 3/2016 | Kim et al. | |
| 2017/0084278 | A1 | 3/2017 | Jung | |
| 2017/0186430 | A1 | 6/2017 | Sharifi | |
| 2017/0330595 | A1 | 11/2017 | Ishida et al. | |
| 2018/0053506 | A1 * | 2/2018 | Konuma | G10L 15/08 |
| 2018/0102125 | A1 | 4/2018 | Ko et al. | |

FOREIGN PATENT DOCUMENTS

| | | |
|---|---|---|
| JP | 2016-119588 | 6/2016 |
| KR | 10-0321565 | 1/2002 |
| KR | 10-2006-0109865 | 10/2006 |
| KR | 10-0650473 | 11/2006 |
| KR | 10-1068122 | 9/2011 |
| KR | 10-1614746 | 5/2016 |
| KR | 10-2017-0081897 | 7/2017 |
| KR | 10-2018-0040426 | 4/2018 |

OTHER PUBLICATIONS

Form PCT/ISA/237, Written Opinion of the International Searching Authority dated Feb. 27, 2020 in International Patent Application No. PCT/KR2019/095045.

Hurwitz et al.: "Keyword Spotting for Google Assistant Using Contextual Speech Recognition", 2017 IEEE Automatic Speech Recognition and Understanding Workshop (ASRU), IEEE, Dec. 16, 2017 (Dec. 16, 2017), pp. 272-278, XP033306848.

Extended European Search Report dated Nov. 26, 2021, issued for European Patent Application No. 19888741.6.

* cited by examiner

ELECTRONIC DEVICE AND CONTROL METHOD THEREOF

CROSS-REFERENCE TO RELATED APPLICATION(S)

This application is in response to and claims priority under 35 U.S.C. § 119 to Korean Patent Application No. 10-2018-0149304, filed on Nov. 28, 2018, in the Korean Intellectual Property Office, the disclosure of which is incorporated by reference herein in its entirety.

BACKGROUND OF THE INVENTION

Field of the Invention

Apparatuses and methods consistent with the disclosure relate to an electronic device and a control method thereof, and more particularly, to an electronic device performing speech recognition, and a control method thereof.

Description of the Related Art

Recently, a speech recognition function has been mounted in a plurality of electronic devices. A user may readily execute the speech recognition function by uttering a designated trigger word.

When the electronic device determines that the user utters the trigger word, the electronic device may activate a speech recognition mode to grasp an intention included in a speech command of the user and perform an operation corresponding to the intention.

Conventionally, there was a case of activating the speech recognition mode by misrecognizing ambient noise of the electronic device as the trigger word even though the user does not utter the trigger word. In addition, a case in which the electronic device does not recognize the trigger word due to ambient noise even though the user utters the trigger word has frequently occurred.

Therefore, only when the user again utters the trigger word, the speech recognition mode is activated, which is inconvenient.

Therefore, the necessity for a technology that enable the electronic device to appropriately recognize the trigger word regardless of the ambient noise has increased.

SUMMARY OF THE INVENTION

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The disclosure provides an electronic device capable of improving a trigger word recognition rate by obtaining text information from an uttered speech of a user, and a control method thereof.

According to an embodiment of the disclosure, an electronic device includes: a storage configured to store recognition related information and misrecognition related information of a trigger word for entering a speech recognition mode; and a processor configured to identify whether or not the speech recognition mode is activated on the basis of characteristic information of a received uttered speech and the recognition related information, identify a similarity between text information of the received uttered speech and text information of the trigger word, and update at least one of the recognition related information or the misrecognition related information on the basis of whether or not the speech recognition mode is activated and the similarity.

The processor may update the misrecognition related information on the basis of the characteristic information of the uttered speech when the speech recognition mode is activated and the similarity is less than a first threshold value.

The processor may update the misrecognition related information when the electronic device is switched from a general mode to the speech recognition mode and the similarity is less than the first threshold value.

The processor may update the recognition related information on the basis of the characteristic information of the uttered speech when the speech recognition mode is inactivated and the similarity is a first threshold value or more.

The processor may activate the speech recognition mode when a similarity between the characteristic information of the uttered speech and the recognition related information is a second threshold value or more and a similarity between the characteristic information of the uttered speech and the misrecognition related information is less than a third threshold value.

The recognition related information of the trigger word may include at least one of an utterance frequency, utterance length information, or pronunciation information of the trigger word, the misrecognition related information of the trigger word may include at least one of an utterance frequency, utterance length information, or pronunciation information of a misrecognized word related to the trigger word, and the characteristic information of the uttered speech may include at least one of a utterance frequency, utterance length information, or pronunciation information of the uttered speech.

The processor may obtain the similarity on the basis of at least one of a similarity between the number of characters included in the text information of the uttered speech and the number of characters included in the text information of the trigger word or similarities between a first character and a last character included in the text information of the uttered speech and a first character and a last character included in the text information of the trigger word.

The processor may store the uttered speech in the storage, and may obtain text information corresponding to each of a plurality of uttered speeches and obtain a similarity between the text information corresponding to each of the plurality of uttered speeches and the text information of the trigger word when the plurality of uttered speeches are stored in the storage.

The electronic device may further include a display, wherein the processor provides a list of a plurality of speech files corresponding to the plurality of uttered speeches through the display and updates the misrecognition related information on the basis of an uttered speech corresponding to a selected speech file when a selection command for one of the plurality of speech files is received.

According to another embodiment of the disclosure, a control method of an electronic device in which recognition related information and misrecognition related information of a trigger word for entering a speech recognition mode are stored includes: identifying whether or not the speech recognition mode is activated on the basis of characteristic information of a received uttered speech and the recognition related information; identifying a similarity between text information of the received uttered speech and text information of the trigger word; and updating at least one of the recognition related information or the misrecognition related information on the basis of whether or not the speech recognition mode is activated and the similarity.

The updating may include updating the misrecognition related information on the basis of the characteristic information of the uttered speech when the speech recognition mode is activated and the similarity is less than a first threshold value.

The updating may include updating the misrecognition related information when the electronic device is switched from a general mode to the speech recognition mode and the similarity is less than the first threshold value.

The updating may include updating the recognition related information on the basis of the characteristic information of the uttered speech when the speech recognition mode is inactivated and the similarity is a first threshold value or more.

The identifying of whether or not the speech recognition mode is activated may include activating the speech recognition mode when a similarity between the characteristic information of the uttered speech and the recognition related information is a second threshold value or more and a similarity between the characteristic information of the uttered speech and the misrecognition related information is less than a third threshold value.

The recognition related information of the trigger word may include at least one of an utterance frequency, utterance length information, or pronunciation information of the trigger word, the misrecognition related information of the trigger word may include at least one of an utterance frequency, utterance length information, or pronunciation information of a misrecognized word related to the trigger word, and the characteristic information of the uttered speech may include at least one of a utterance frequency, utterance length information, or pronunciation information of the uttered speech.

The identifying of the similarity may include obtaining the similarity on the basis of at least one of a similarity between the number of characters included in the text information of the uttered speech and the number of characters included in the text information of the trigger word or similarities between a first character and a last character included in the text information of the uttered speech and a first character and a last character included in the text information of the trigger word.

The control method may further include storing the uttered speech in a storage, wherein the identifying of the similarity includes obtaining text information corresponding to each of a plurality of uttered speeches and obtaining a similarity between the text information corresponding to each of the plurality of uttered speeches and the text information of the trigger word when the plurality of uttered speeches are stored in the storage.

The control method may further include: providing a list of a plurality of speech files corresponding to the plurality of uttered speeches; and updating the misrecognition related information on the basis of an uttered speech corresponding to a selected speech file when a selection command for one of the plurality of speech files is received.

According to still another embodiment of the disclosure, there is provided a non-transitory computer-readable medium storing a computer instruction that, in a case of being executed by a processor of an electronic device, causes the electronic device to perform the following steps: identifying whether or not a speech recognition mode is activated on the basis of characteristic information of an uttered speech of a user and recognition related information of a trigger word when the uttered speech is received; identifying a similarity between text information of the uttered speech and text information of the trigger word; and updating at least one of the recognition related information or misrecognition related information on the basis of whether or not the speech recognition mode is activated and the similarity.

According to the diverse embodiment of the disclosure, the electronic device may recognize whether or not the trigger word is uttered in consideration of noise of an ambient environment, utterance characteristics of a user, and the like, and a misrecognition rate of the trigger word is reduced, such that the speech recognition mode may be activated or inactivated depending on a user's intention.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1A:
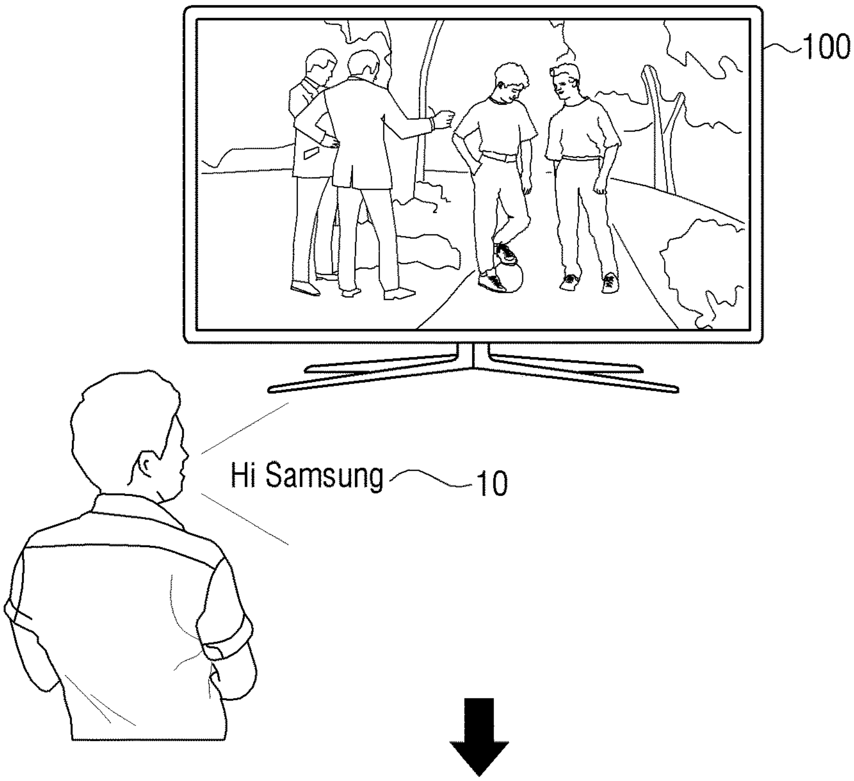
FIGS. 1A and 1B are views for describing an operation of activating a speech recognition mode according to an embodiment of the disclosure.

Hereinafter, the disclosure will be described in detail with reference to the accompanying drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

In the specification, an expression "have", "may have", "include", "may include", or the like, indicates existence of a corresponding feature (for example, a numerical value, a function, an operation, a component such as a part, or the like), and does not exclude existence of an additional feature.

An expression "at least one of A and/or B" is to be understood to represent "A" or "B" or "any one of A and B".

Expressions "first", "second", or the like, used in the specification may indicate various components regardless of a sequence and/or importance of the components, will be used only to distinguish one component from the other components, and do not limit the corresponding components.

When it is mentioned that any component (for example, a first component) is (operatively or communicatively} coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In the disclosure, a "module" or a "~er/or" may perform at least one function or operation, and be implemented by hardware or software or be implemented by a combination of hardware and software. In addition, a plurality of "modules" or a plurality of "~ers/~ors" may be integrated in at least one module and be implemented by at least one processor (not illustrated) except for a "module" or a "~er/or" that needs to be implemented by specific hardware.

In the disclosure, a term "user" may refer to a person using an electronic device or a device (for example, an artificial intelligence electronic device) using an electronic device.

Hereinafter, an embodiment of the disclosure will be described in detail with reference to the accompanying drawings.

Figure 1B:
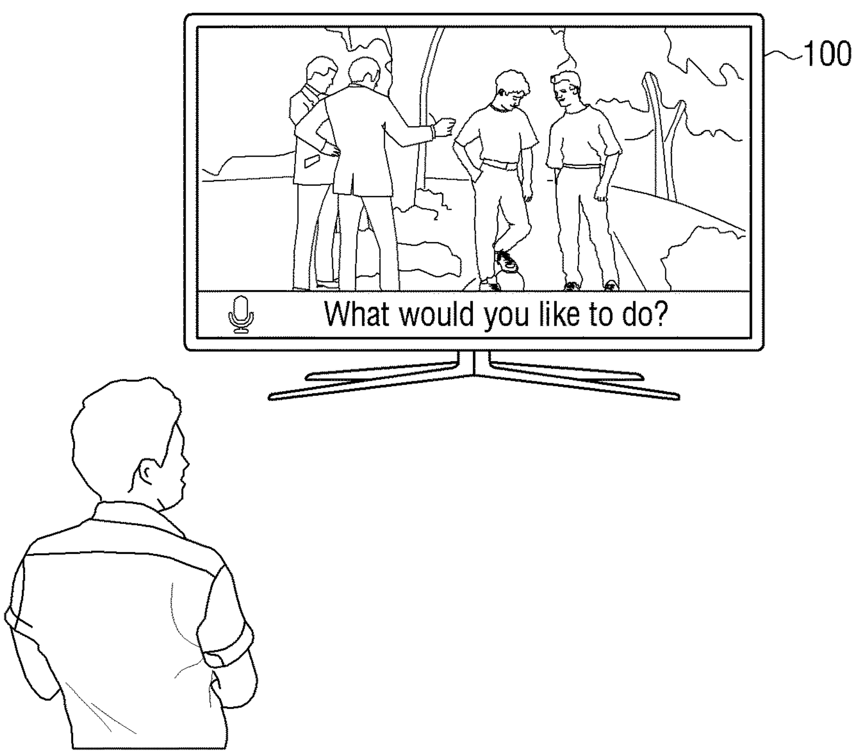

FIGS. 1A and 1B are views for describing an operation of activating a speech recognition mode according to an embodiment of the disclosure.

Referring to FIGS. 1A and 1B, an electronic device 100 may enter a speech recognition mode depending on an uttered speech 10 of a user.

Although a case in which the electronic device 100 is a television (TV) is illustrated in FIG. 1, this is only an example, and the electronic device 100 may be implemented in various forms. Electronic devices according to diverse embodiments of the specification may include at least one of, for example, a smartphone, a tablet personal computer (PC), a mobile phone, a video phone, an e-book reader, a desktop PC, a laptop PC, a netbook computer, a workstation, a server, a personal digital assistants (PDA), a portable multimedia player (PMP), an MP3 player, a medical device, a camera, or a wearable device. The wearable device may include at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), and a living body implantation type wearable device. In some embodiments, the electronic device may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a media box (for example, HomeSync™ of Samsung Electronics Co., Ltd, TV™ of Apple Inc, or TV™ of Google), a game console (for example Xbox™, PlayStation™), an electronic dictionary, an electronic key, a camcorder, or a digital photo frame.

In other embodiments, the electronic device may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, or Internet of things (IoT) devices (for example, a light bulb, various sensors, a sprinkler system, a fire alarm, a thermostat, a street light, a toaster, an exercise equipment, a hot water tank, a heater, a boiler, and the like).

The electronic device 100 according to an embodiment of the disclosure may receive the uttered speech 10 of the user. As an example, the electronic device 100 may include a microphone (not illustrated), and receive the uttered speech 10 of the user through the microphone. As another example, the electronic device 100 may receive the uttered speech 10 of the user through a remote control device (not illustrated) or an external electronic device (not illustrated) (not illustrated) provided with a microphone. The electronic device 100 may activate a speech recognition mode on the basis of the received uttered speech 10. Here, the speech recognition mode is a mode in which the electronic device 100 recognizes the uttered speech 10 of the user and performs a function corresponding to the uttered speech. For example, the electronic device 100 may perform a function corresponding to a specific keyword obtained from the uttered speech 10 of the user.

The electronic device 100 according to an embodiment of the disclosure may identify whether or not the uttered speech 10 of the user is a predetermined word. Here, the predetermined word may be a word activating the speech recognition mode and having a predetermined length of three or four syllables. Referring to FIG. 1A, a case in which the electronic device 100 receives 'Hi Samsung', which is the uttered speech 10 of the user, may be assumed. As illustrated in FIG. 1B, the electronic device 100 may activate the speech recognition mode when it is identified that 'Hi Samsung' corresponds to the predetermined word. Here, the activation of the speech recognition mode may mean that the electronic device enters a mode in which it recognizes the uttered speech of the user (for example, a state in which a component related to speech recognition enters a normal mode from a standby mode, a state in which power is supplied to a component related to speech recognition, or the like). According to an example, the activation of the speech recognition mode may include a case in which a mode is switched from a general mode to the speech recognition mode.

According to an example, in the speech recognition mode, a content that is being provided to the user in the general mode may be displayed in one region, and a user interface (UI) indicating that the mode is switched to the speech recognition mode may be displayed in the other region. Meanwhile, this is only an example, and the disclosure is not limited thereto. As another example, the electronic device 100 may notify the user that the speech recognition mode is activated (or the mode is switched from the general mode to the speech recognition mode) through a sound (for example, a beep), or the like. Hereinafter, for convenience of explanation, it is assumed that the activation of the speech recognition mode includes a case in which the mode of the electronic device 100 is switched from the general mode to the speech recognition mode.

As another example, the electronic device 100 may inactivate the speech recognition mode when it is identified that 'Hi Samsung' does not correspond to the predetermined word.

Meanwhile, the predetermined word may be called a trigger word, a wakeup word, or the like. Hereinafter, the predetermined word will be collectively referred to as the wakeup word for convenience of explanation. The wakeup word may be predetermined in a process of manufacturing the electronic device 100 or may be edited, for example, added or deleted, depending on a setting of the user. As another example, the wakeup word may be changed or added through a firmware update or the like.

Figure 2:
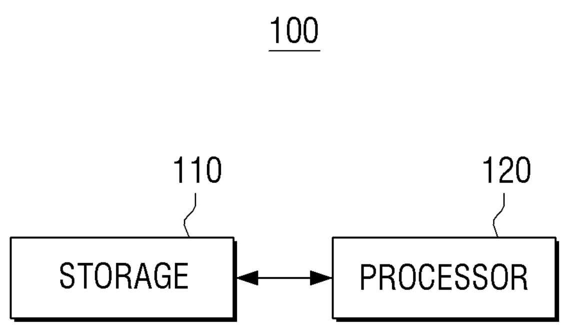
FIG. 2 is a block diagram illustrating components of an electronic device according to an embodiment of the disclosure.

FIG. 2 is a block diagram illustrating components of an electronic device according to an embodiment of the disclosure.

Referring to FIG. 2, the electronic device 100 includes a storage 110 and a processor 120.

The storage 110 stores various data such as an operating system (O/S) software module for driving the electronic device 100 and various multimedia contents.

Particularly, the storage 110 may store recognition related information and misrecognition related information of the wakeup word for entering the speech recognition mode.

The recognition related information of the wakeup word may include at least one of an utterance frequency, utterance length information, or pronunciation information of the wakeup word activating the speech recognition mode. Here, the utterance frequency may include information on a frequency change rate, an amplitude change rate and the like when a person utters the wakeup word. Utterance frequencies of the wakeup word may be various depending on a structure such as a mouth, a vocal cord, a throat, or the like, age, sex, race, and the like, of a person. The recognition related information according to an embodiment of the disclosure may include a plurality of utterance frequencies. Here, the utterance frequency may be called a vocalization frequency or the like, but will hereinafter be collectively referred to as an utterance frequency for convenience of explanation.

The utterance length information of the wakeup word may include an average utterance length, lower to upper utterance lengths, and the like, when the person utters the wakeup word.

The pronunciation information of the wakeup word may be information transcribing a pronunciation when the person utters the wakeup word. For example, a wakeup word 'Hi TV' is variously pronounced depending on a person, and the pronunciation information may thus include a plurality of pronunciations.

The misrecognition related information according to an embodiment of the disclosure may include at least one of an utterance frequency, utterance length information, or pronunciation information of a misrecognized word related to the wakeup word.

Here, the misrecognized word related to the wakeup word may refer to various words that are not the wakeup words, but may be misrecognized as the wakeup word by the electronic device 100 depending on a result trained through speech noise or non-speech noise. Here, the misrecognized word related to the wakeup word is not necessarily limited to a word having a linguistic meaning.

As an example, the storage 110 according to an embodiment of the disclosure may collect various types of noise and include misrecognition related information trained on the basis of the collected noise. For example, the electronic device 100 may collect the speech noise and the non-speech noise, and include the misrecognition related information obtained by training the collected noise through a Gaussian mixture model (GMM). Here, the speech noise is not a linguistically meaningful communication unit, but may refer to a sound produced by a person. For example, a sneezing sound, a burping sound, a breathing sound, a snoring sound, a laughing sound, a crying sound, an exclamation, foreign languages spoken by foreigners, and the like, can be included in the speech noise. The non-speech noise may refer to all kinds of noise except for the sound produced by the person. For example, noise generated in a home and an office, channel noise, background noise, a music sound, a phone ring tone, and the like, may be included in the non-speech noise.

A case in which speech noise and the non-speech noise are recognized as the wakeup word by the electronic device 100 even though they are not wakeup word and the electronic device 100 enters the speech recognition mode often occurs. To prevent such a case, the misrecognition related information machine-trained on the basis of the speech noise and the non-speech noise may be stored in the storage 110.

The utterance frequency of the misrecognized word related to the wakeup word according to an embodiment of the disclosure may include information on a frequency change rate, an amplitude change rate and the like at the time of utterance of an identified word that is not the wakeup word, but is recognized as the wakeup word in the electronic device 100 depending on a training result. When the misrecognized word is the noise, the utterance frequency may include information on a frequency change rate, an amplitude change rate and the like of the noise.

The utterance length information of the misrecognized word may include an average utterance length, lower to upper utterance lengths, and the like, when the person utters the misrecognized word. When the misrecognized word is the noise, the utterance length information may include a length of the noise.

The pronunciation information of the misrecognized word may be information transcribing a pronunciation when the person utters the misrecognized word. For example, a case in which the wakeup word is 'Hi Bixby' and the misrecognized word related to the wakeup word is 'Hi Bibi' may be assumed. The pronunciation information may include pronunciations of 'Hi Bibi' variously pronounced depending on a person.

Meanwhile, the misrecognition related information may be called a garbage model, or the like, but will hereinafter be collectively referred to as misrecognition related information for convenience of explanation.

The processor 120 controls a general operation of the electronic device 100.

The processor 120 may be implemented by a digital signal processor (DSP), a microprocessor, or a time controller (TCON) processing a digital signal. However, the processor 120 is not limited thereto, and may include one or more of a central processing unit (CPU), a micro controller unit (MCU), a micro processing unit (MPU), a controller, an application processor (AP), a graphics processing unit (GPU) or a communication processor (CP), or an ARM processor, or may be defined by these terms. In addition, the processor 120 may be implemented by a system-on-chip (SoC) or a large scale integration (LSI) in which a processing algorithm is embedded, or may be implemented in a field programmable gate array (FPGA) form. The processor 120 may perform various functions by executing computer executable instructions stored in the storage 110.

Particularly, the processor 120 may identify whether or not the speech recognition mode is activated on the basis of characteristic information of the uttered speech 10 of the user and the recognition related information when the uttered speech 10 of the user is received. As an example, the processor 120 may analyze the uttered speech 10 of the user to obtain the characteristic information. Here, the characteristic information may include at least one of the utterance frequency, the utterance length information, or the pronunciation information. Then, the processor 120 may identify whether or not the speech recognition mode is activated on the basis of a similarity between the characteristic information of the uttered speech 10 and the recognition related information. Hereinafter, for convenience of explanation, the similarity between the characteristic information of the uttered speech 10 and the recognition related information will be collectively referred to as a first similarity.

An utterance frequency of the characteristic information according to an embodiment of the disclosure may include information on a frequency change rate, an amplitude change rate and the like of the received uttered speech 10. The processor 120 may identify the first similarity between the utterance frequency according to the characteristic information and the utterance frequency included in the recognition related information.

The utterance length information of the characteristic information may include a length, a duration and the like of the uttered speech 10. The processor 120 may identify the first similarity between the utterance length information according to the characteristic information and the utterance length information included in the recognition related information.

The pronunciation information of the characteristic information according to an embodiment of the disclosure may refer to a set of pronunciations for each phoneme obtained by decomposing the uttered speech 10 in a phoneme unit. Here, the phoneme refers to a distinguishable minimum sound unit. The processor 120 may identify the first similarity between the pronunciation information according to the characteristic information and the pronunciation information included in the recognition related information.

The processor 120 according to an embodiment of the disclosure may activate the speech recognition mode when the first similarity between the characteristic information and the speech recognition information of the uttered speech 10 is a threshold value or more. As an example, when the first similarity between the characteristic information and the speech recognition information of the uttered speech 10 is 0.5 (threshold value) or more, the processor 120 may identify that the uttered speech 10 of the user corresponds to the wakeup word to activate the speech recognition mode. This will be described in detail with reference to FIG. 4.

As another example, when the first similarity between the characteristic information and the speech recognition information of the uttered speech 10 is less than the threshold value, the processor 120 may identify that the uttered speech 10 of the user does not correspond to the wakeup word to inactivate the speech recognition mode. This will be described in detail with reference to FIG. 5.

Here, the processor 120 may use various similarity measuring algorithms to determine the similarity. For example, the processor 120 may obtain the first similarity having a value of 0 to 1 on the basis of a vector value of a frequency domain of the characteristic information of the uttered speech 10 and a vector value of a frequency domain of the recognition related information. As the characteristic information of the uttered speech 10 and the speech recognition information become similar to each other, the first similarity may have a value that becomes close to 1, and as the characteristic information of the uttered speech 10 and the speech recognition information do not become similar to each other, the first similarity may have a value that becomes close to 0. The threshold value may be set by a manufacturer, and may be changed by a setting of a user or a firmware upgrade, or the like.

The processor 120 according to an embodiment of the disclosure may obtain text information of the uttered speech 10. For example, the processor 120 may apply a speech to text (STT) function to the uttered speech 10 to obtain the text information corresponding to the uttered speech 10. Meanwhile, the processor 120 may directly apply the STT function to the uttered speech 10 to obtain the text information. In some cases, the processor 120 may receive the text information corresponding to the uttered speech 10 from a server (not illustrated). As an example, the processor 120 may transmit the received uttered speech 10 to the server. The server may convert the uttered speech 10 into the text information using the STT function, and transmit the text information to the electronic device 100.

The processor 120 according to an embodiment of the disclosure may identify a similarity between the text information of the uttered speech 10 and text information of the wakeup word. Hereinafter, the similarity between the text information of the uttered speech 10 and the text information of the wakeup word will be collectively referred to as a second similarity not to be confused with the first similarity.

The processor 120 may identify the second similarity using various types of text similarity algorithms and word similarity algorithms. For example, the processor 120 may obtain the text information 'Hi TV' of the uttered speech 10. Then, the processor 120 may identify the second similarity using a word similarity algorithm between the obtained text information 'Hi TV' and the text information 'Hi TV' of the wakeup word.

The processor 120 according to an embodiment may perform syntactic analysis on the text information of the uttered speech 10 using a natural language understanding (NLU) module. Here, the syntactic analysis may divide the text information into a syntactic unit (for example, a word, a phrase, a morpheme, or the like) to identify which syntactic element the text information has. The processor 120 may identify the second similarity between a syntactic element included in the uttered speech 10 and a syntactic element included in the wakeup word. The processor 120 may also identify the second similarity between a word included in the text information of the uttered speech 10 and a word included in the text information of the wakeup word.

The processor 120 according to an embodiment of the disclosure may obtain the second similarity on the basis of a similarity between the number of characters included in the text information of the uttered speech and the number of characters included in the text information of the wakeup word. As another example, the processor 120 may obtain the second similarity on the basis of at least one of similarities between a first character and a last character included in the text information of the uttered speech and a first character and a last character included in the text information of the wakeup word.

Meanwhile, this is only an example, and the processor 120 may obtain the second similarity using various similarity measuring algorithms. For example, the processor 120 may identify the second similarity between the text information of the uttered speech and the text information of the wakeup word using a Levenshtein distance or an edit distance. In addition, the second similarity may have a value of 0 to 1. As the second similarity between the text information of the uttered speech 10 and the text information of the wakeup word becomes relatively high, the second similarity has a value that becomes 1, and as the second similarity between the text information of the uttered speech 10 and the text information of the wakeup word becomes relatively low, the second similarity has a value that becomes 0. Meanwhile, this is only an example, and the second similarity may have values in various ranges depending on an algorithm.

Meanwhile, the natural language understanding (NLU) module may be called various terms such as a natural language processing module and the like, but will hereinafter be collectively referred to as a natural language understanding module. A case in which the natural language understanding module is implemented by separate hardware has been described, but the processor 120 may also perform a function of the natural language understanding module. As another example, the server may perform the function of the natural language understanding module and transmit an identified result to the electronic device 100.

The processor 120 according to an embodiment of the disclosure may update at least one of the recognition related information and the misrecognition related information on the basis of whether or not the speech recognition mode is activated and the second similarity.

As an example, the processor 120 may update the misrecognition related information on the basis of the characteristic information of the uttered speech 10 when the speech recognition mode is activated and the second similarity is less than a first threshold value. This will be described with reference to FIG. 4.

Figure 4:
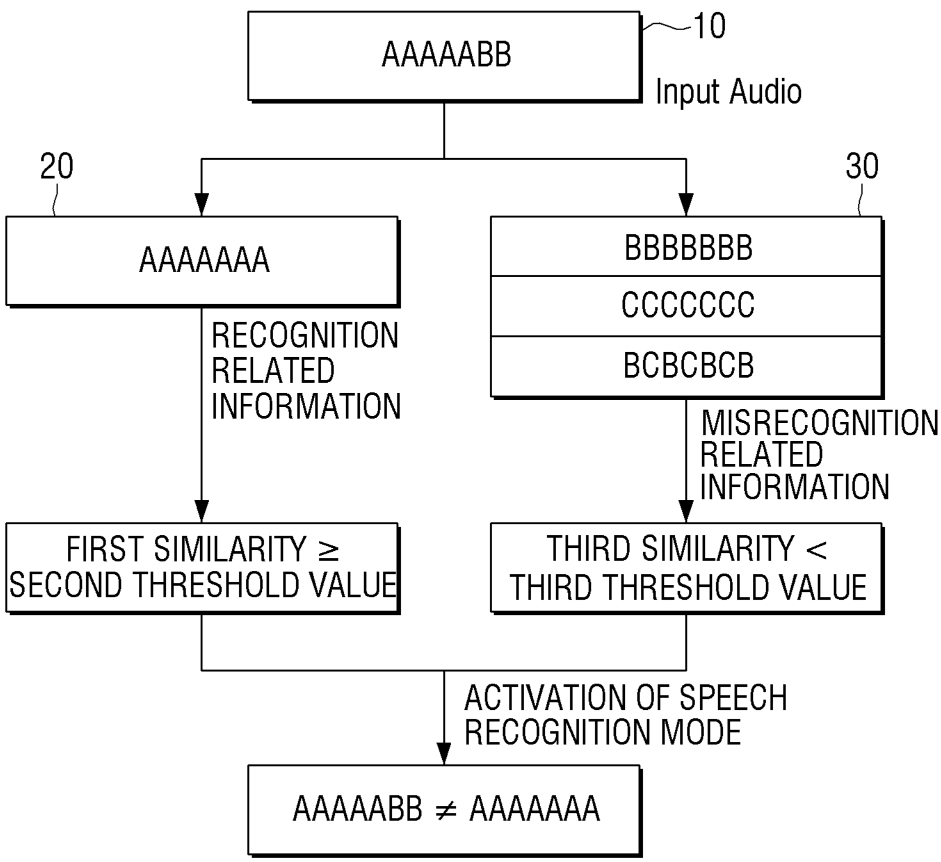
FIG. 4 is a view for describing an operation of activating a speech recognition mode according to an embodiment of the disclosure.

FIG. 4 is a view for describing an operation of activating a speech recognition mode according to an embodiment of the disclosure.

Referring to FIG. 4, the processor 120 may obtain the characteristic information of the received uttered speech 10. Then, the processor 120 may obtain the first similarity between the characteristic information of the uttered speech 10 and the recognition related information 20. The processor 120 may activate the speech recognition mode when the first similarity is a second threshold value or more.

Meanwhile, a processor 120 according to another embodiment of the disclosure may obtain a similarity between the characteristic information of the uttered speech 10 and the misrecognition related information 30. Hereinafter, the similarity between the characteristic information of the uttered speech 10 and the misrecognition related information 30 will be collectively referred to as a third similarity not to be confused with the first and second similarities.

The processor 120 may activate the speech recognition mode when the first similarity is the second threshold value or more and the third similarity is less than a third threshold value. For example, a case in which the second threshold value is 0.5 and the third threshold value is 0.3 may be assumed. The processor 120 may activate the speech recognition mode when the first similarity between the characteristic information of the uttered speech 10 and the recognition related information 20 is the second threshold value (0.5) or more and the third similarity between the characteristic information of the uttered speech 10 and the misrecognition related information 30 is less than the third threshold value (0.3). Meanwhile, specific values of the second threshold value and the third threshold value are only an example, and the second threshold value and the third threshold value may be the same as or different from each other.

The processor 120 according to an embodiment of the disclosure may obtain the text information (for example, AAAABB) of the uttered speech 10. Then, the processor 120 may obtain the second similarity between the text information of the uttered speech 10 and the text information (for example, AAAAAA) of the wakeup word. The processor 120 may update the misrecognition related information on the basis of the characteristic information of the uttered speech when the second similarity is less than the first threshold value.

For example, a case in which the first similarity between the characteristic information of the received uttered speech 10 and the recognition related information is the second threshold value or more due to speech noise and non-speech noise generated in an ambient environment in which the electronic device 100 is positioned even though the text information of the uttered speech 10 does not correspond to the text information of the wakeup word (for example, AAAABB≠AAAAAA) may be assumed.

The processor 120 according to an embodiment of the disclosure may not apply the STT function or the natural language understanding (NLU) module to the received uttered speech 10 before the speech recognition mode is activated. Therefore, even though the text information of the uttered speech 10 does not correspond to the text information of the wakeup word (for example, AAAABB≠AAAAAA), the processor 120 may activate the speech recognition mode.

The processor 120 according to an embodiment may identify that the uttered speech 10 is misrecognized when the speech recognition mode is activated and the second similarity is less than the first threshold value. Then, the processor 120 may update the misrecognition related information 30 on the basis of the characteristic information of the uttered speech 10. For example, the processor 120 may add at least one of the utterance frequency, the utterance length, or the pronunciation information of the uttered speech 10 included in the characteristic information of the uttered speech 10 to the misrecognition related information 30.

The processor 120 according to an embodiment may identify that the uttered speech 10 is misrecognized when the electronic device 100 is switched from the general mode to the speech recognition mode depending on the received uttered speech and the second similarity is less than the first threshold value. Then, the processor 120 may update the misrecognition related information 30 on the basis of the characteristic information of the uttered speech 10.

A third similarity between an uttered speech 10' received subsequently and the updated misrecognition related information 30 may be the third threshold value or more. In this case, the processor 120 may not activate the speech recognition mode.

Returning to FIG. 2, as another example, the processor 120 may update the recognition related information on the basis of the characteristic information of the uttered speech 10 when the speech recognition mode is inactivated and the second similarity is the first threshold value or more. This will be described with reference to FIG. 5.

Figure 5:
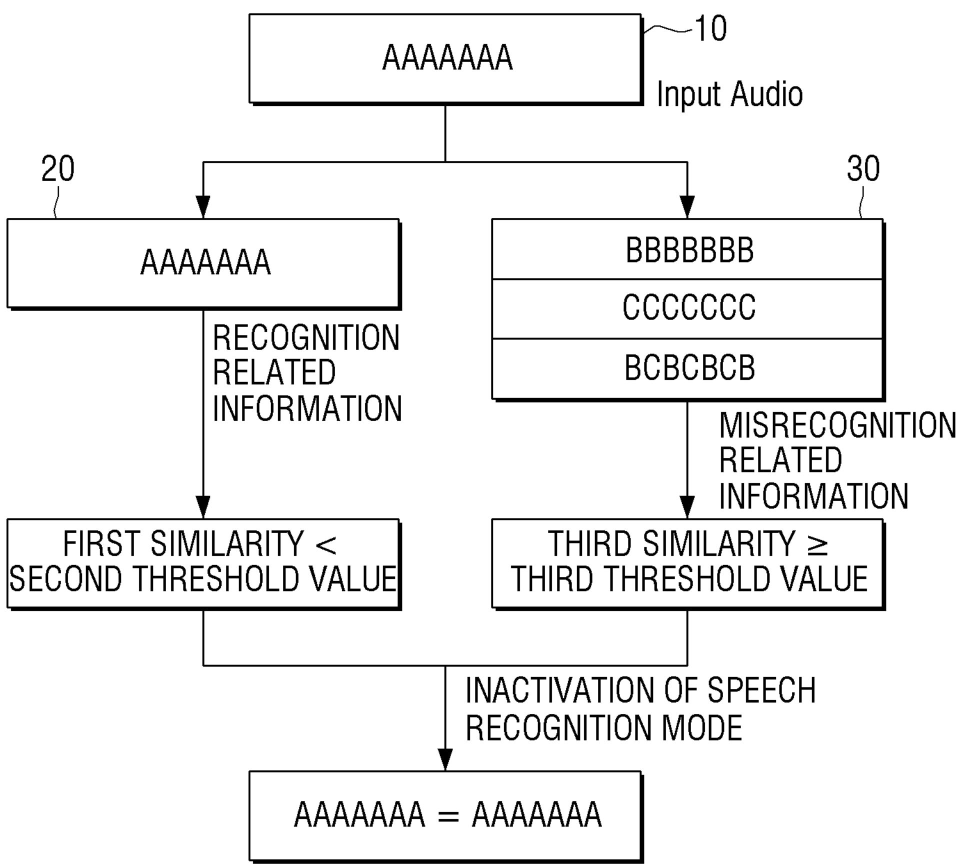
FIG. 5 is a view for describing an operation of inactivating a speech recognition mode according to an embodiment of the disclosure.

FIG. 5 is a view for describing an operation of inactivating a speech recognition mode according to an embodiment of the disclosure.

Referring to FIG. 5, the processor 120 may obtain the first similarity between the characteristic information of the uttered speech 10 and the recognition related information 20. The processor 120 may inactivate the speech recognition mode when the first similarity is less than the second threshold value.

Meanwhile, the processor 120 according to another embodiment of the disclosure may obtain the third similarity between the characteristic information of the uttered speech 10 and the misrecognition related information 30. The processor 120 may inactivate the speech recognition mode when the first similarity is less than the second threshold value and the third similarity is the third threshold value or more. For example, the processor 120 may inactivate the speech recognition mode when the first similarity between the characteristic information of the uttered speech 10 and the recognition related information 20 is less than the second threshold value (0.5) and the third similarity between the characteristic information of the uttered speech 10 and the misrecognition related information 30 is the third threshold value (0.3) or more. Meanwhile, specific values of the second threshold value and the third threshold value are only an example, and the second threshold value and the third threshold value may be variously changed depending on a manufacturer or a setting of a user.

The processor 120 according to an embodiment of the disclosure may obtain the text information (for example, AAAAAA) of the uttered speech 10. Then, the processor 120 may obtain the second similarity between the text information of the uttered speech 10 and the text information (for example, AAAAAA) of the wakeup word. The processor 120 may update the recognition related information on the basis of the characteristic information of the uttered speech 10 when the second similarity is the first threshold value or more.

For example, a case in which the first similarity between the characteristic information of the received uttered speech 10 and the recognition related information is less than the second threshold value due to speech noise and non-speech noise generated in an ambient environment in which the electronic device 100 is positioned even though the text information of the uttered speech 10 corresponds to the text information of the wakeup word (for example, AAAAAA=AAAAAA) may be assumed.

The processor 120 according to an embodiment of the disclosure may not apply the STT function or the natural language understanding (NLU) module to the received uttered speech 10 before the speech recognition mode is activated. Therefore, even though the text information of the uttered speech 10 corresponds to the text information of the wakeup word (for example, AAAAAA=AAAAAA), the processor 120 may inactivate the speech recognition mode.

The processor 120 according to an embodiment may identify that the uttered speech 10 is misrecognized when the speech recognition mode is inactivated and the second similarity is less than the first threshold value. Then, the processor 120 may update the recognition related information 20 on the basis of the characteristic information of the uttered speech 10. For example, the processor 120 may add at least one of the utterance frequency, the utterance length, or the pronunciation information of the uttered speech 10 included in the characteristic information of the uttered speech 10 to the recognition related information 20.

A first similarity between an uttered speech 10' received subsequently and the updated recognition related information 20 may be the second threshold value or more. In this case, the processor 120 may activate the speech recognition mode. Meanwhile, this is only an example, and the processor 120 may also update the misrecognition related information 30. In this case, the third similarity between the uttered speech 10' received subsequently and the updated misrecognition related information 30 may be less than the third threshold value.

Returning to FIG. 2, the processor 120 according to an embodiment of the disclosure may store the uttered speech 10 in the storage 110, and may obtain text information corresponding to each of a plurality of uttered speeches and obtain a second similarity between the text information corresponding to each of the plurality of uttered speeches and text information of the wakeup word when the plurality of uttered speeches are stored in the storage 110.

Figure 6:
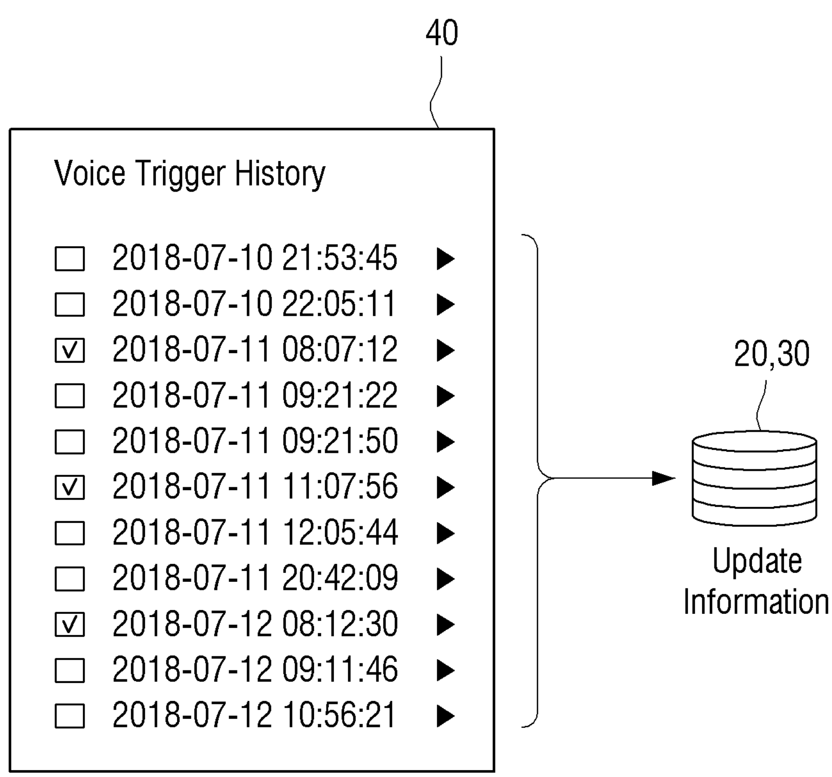
FIG. 6 is a view for describing a list of speech files according to an embodiment of the disclosure.

FIG. 6 is a view for describing a list of speech files according to an embodiment of the disclosure.

Referring to FIG. 6, the processor 120 according to an embodiment of the disclosure may provide a list 40 of a plurality of speech files corresponding to the plurality of uttered speeches.

When a playing command of the user is received, the processor 120 may play a speech file corresponding to the playing command among the plurality of speech files included in the list 40.

When a selection command for one of the plurality of speech files is received, the processor 120 according to an embodiment may add characteristic information of an uttered speech corresponding to the received selection command to the recognition related information 20 or the misrecognition related information 30.

As an example, in a case in which the speech recognition mode is activated even though the selected speech file does not include the wakeup word, the processor 120 may obtain the characteristic information of the uttered speech from the selected speech file and update the misrecognition related information 30 on the basis of the obtained characteristic information.

As another example, in a case in which the speech recognition mode is inactivated even though the selected speech file includes the wakeup word, the processor 120 may obtain the characteristic information of the uttered speech from the selected speech file and update the recognition related information 20 on the basis of the obtained characteristic information.

The list 40 according to an embodiment of the disclosure may include a predetermined number of speech files. As an example, speech files in which forty recent uttered speeches are recorded may be provided as the list 40. As another example, speech files recorded within a period set by the user may be provided as the list 40.

Figure 3:
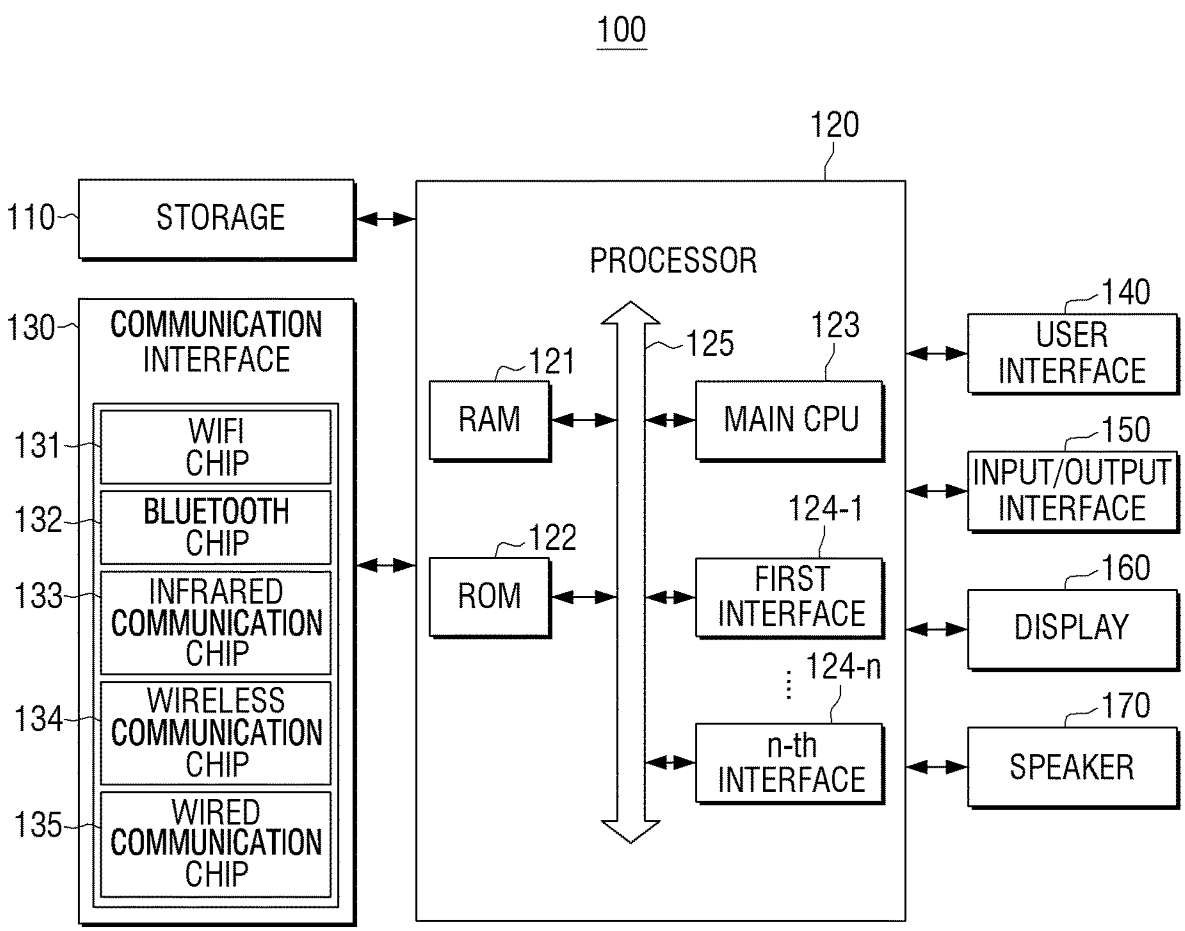
FIG. 3 is a block diagram illustrating detailed components of the electronic device according to an embodiment of the disclosure.

FIG. 3 is a block diagram illustrating detailed components of the electronic device according to an embodiment of the disclosure.

Referring to FIG. 3, the electronic device 100 according to an embodiment of the disclosure may include the storage 110, the processor 120, a communication interface 130, a user interface 140, an input/output interface 150, and a display 160. A detailed description for components overlapping components illustrated in FIG. 2 among components illustrated in FIG. 3 will be omitted.

The storage 110 may be implemented by an internal memory such as a read-only memory (ROM) (for example, an electrically erasable programmable read-only memory (EEPROM)), a random access memory (RAM), or the like, included in the processor 120 or be implemented by a memory separate from the processor 120. In this case, the storage 110 may be implemented in a form of a memory embedded in the electronic device 100 or a form of a memory attachable to and detachable from the electronic device 100, depending on a data storing purpose. For example, data for driving the electronic device 100 may be stored in the memory embedded in the electronic device 100, and data for an extension function of the electronic device 100 may be stored in the memory attachable to and detachable from the electronic device 100. Meanwhile, the memory embedded in the electronic device 100 may be implemented by at least one of a volatile memory (for example, a dynamic RAM (DRAM), a static RAM (SRAM), a synchronous dynamic RAM (SDRAM), or the like) or a non-volatile memory (for example, a one time programmable ROM (OTPROM), a programmable ROM (PROM), an erasable and programmable ROM (EPROM), an electrically erasable and programmable ROM (EEPROM), a mask ROM, a flash ROM, a flash memory (for example, an NAND flash, a NOR flash or the like), a hard drive, or a solid state drive (SSD)), and the memory attachable to and detachable from the electronic device 100 may be implemented in a form such as a memory card (for example, a compact flash (CF), a secure digital (SD), a micro-SD, a mini-SD, an extreme digital (xD), a multi-media card (MMC), or the like), an external memory (for example, a universal serial bus (USB) memory) connectable to a USB port, or the like.

The processor 120 is a component for controlling a general operation of the electronic device 100. For example, the processor 120 may drive an operating system or an application to control a plurality of hardware or software components connected to the processor 120 and perform various kinds of data processing and calculation. The processor 120 generally controls an operation of the electronic device 100 using various programs stored in the storage 110.

In detail, the processor 120 includes a RAM 121, a ROM 122, a main central processing unit (CPU) 123, first to n-th interfaces 124-1 to 134-*n*, and a bus 125.

The RAM 121, the ROM 122, the main CPU 123, the first to n-th interfaces 124-1 to 124-*n*, and the like, may be connected to each other through the bus 125.

An instruction set for booting a system, or the like, is stored in the ROM 122. When a turn-on command is input to supply power to the main CPU 123, the main CPU 123 copies the operating system (O/S) stored in the storage 110 to the RAM 121 depending on an instruction stored in the ROM 122, and execute the O/S to boot the system. When the booting is completed, the main CPU 123 copies various application programs stored in the storage 110 to the RAM 121, and executes the application programs copied to the RAM 121 to perform various operations.

The main CPU 123 accesses the storage 110 to perform booting using the O/S stored in the storage 110. In addition, the main CPU 123 performs various operations using various programs, contents, data, and the like, stored in the storage 110.

The first to n-th interfaces 124-1 to 124-*n* are connected to the various components described above. One of the interfaces may be a network interface connected to an external device through a network.

Meanwhile, the processor 120 may perform a graphic processing function (video processing function). For example, the processor 120 may render a screen including various objects such as an icon, an image, a text, and the like, using a calculator (not illustrated) and a renderer (not illustrated). Here, the calculator (not illustrated) may calculate attribute values such as coordinate values at which the respective objects will be displayed, forms, sizes, colors, and the like, of the respective objects depending on a layout of the screen on the basis of a received control command. In addition, the renderer (not illustrated) renders screens of various layouts including objects on the basis of the attribute values calculated in the calculator (not illustrated). In addition, the processor 120 may perform various kinds of image processing such as decoding, scaling, noise filtering, frame rate converting, resolution converting, and the like, for the video data.

Meanwhile, the processor 120 may perform processing on audio data. In detail, the processor 120 may perform various kinds of processing such as decoding, amplifying, noise filtering, and the like, on the audio data.

The communication interface 130 is a component performing communication with various types of external devices depending on various types of communication manners. The communication interface 130 includes a wireless fidelity (WiFi) module 131, a Bluetooth module 132, an infrared communication module 133, a wireless communication module 134, and the like. The processor 120 performs communication with various external devices using the communication interface 130. Here, the external devices include a display device such as a TV, an image processing devices such as a set-top box, an external server, a control device such as a remote control, a sound output device such as a Bluetooth speaker, a lighting device, a home appliance such as a smart cleaner or a smart refrigerator, a server such as an IOT home manager or the like, and the like.

The WiFi module 131 and the Bluetooth module 132 perform communication in a WiFi manner and a Bluetooth manner, respectively. In the case of using the WiFi module 131 or the Bluetooth module 132, various kinds of connection information such as a service set identifier (SSID), a session key and the like, are first transmitted and received, communication is connected using the connection information, and various kinds of information may then be transmitted and received.

The infrared communication module 133 performs communication according to an infrared data association (IrDA) technology of wirelessly transmitting data to a short distance using an infrared ray positioned between a visible ray and a millimeter wave.

The wireless communication module 134 may include at least one communication chip performing communication according to various wireless communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), and the like, in addition to the communication manner described above.

A wired communication module 135 may include at least one of a local area network (LAN) module or an Ethernet module and at least one of wired communication modules performing communication using a pair cable, a coaxial cable, an optical fiber cable, or the like.

According to an example, the communication interface 130 may use the same communication module (for example, the WiFi module) to communicate with an external device such as a remote control and an external server.

According to an example, the communication interface 130 may use different communication modules (for example, WiFi modules) to communicate with an external device such as a remote control and an external server. For example, the communication interface 130 may use at least one of the Ethernet module or the WiFi module to communicate with the external server, and may use a BT module to communicate with the external device such as the remote control. However, this is only an example, and the communication interface 130 may use at least one of various communication modules in a case in which it communicates with a plurality of external devices or external servers.

According to an embodiment of the disclosure, the communication interface 130 may perform the external device such as the remote control and the external server. As an example, the communication interface 130 may receive the uttered speech 10 of the user from the external device including a microphone. In this case, the received uttered speech 10 of the user and a speech signal may be a digital speech signal, but may be an analog speech signal according to an implementation. As an example, the electronic device 100 may receive a user speech signal through a wireless communication method such as Bluetooth, WiFi or the like. Here, the external device may be implemented by a remote control device or a smartphone. According to an embodiment of the disclosure, the external device may install or delete an application for controlling the electronic device 100 depending on a purpose of a manufacturer or control of the user. As an example, the smartphone may install a remote control application for controlling the electronic device 100. Then, a user speech may be received through the microphone included in the smartphone, and a control signal corresponding to the received user speech may be obtained and transmitted to the electronic device 100 through the remote control application. Meanwhile, this is only an example, and the disclosure is not necessarily limited thereto. As an example, the smartphone may transmit the received user speech to a speech recognition server, obtain the control signal corresponding to the user speech from the speech recognition server, and transmit the obtained control signal to the electronic device 100.

The electronic device 100 may transmit the received speech signal to the external server to recognize the speech of the speech signal received from the external device. The communication interface 130 may perform communication with the external server to receive the characteristic information of the uttered speech 10, the text information of the uttered speech 10, and the like.

In this case, communication modules for communication with the external device and the external server may be implemented by a single communication module or may be implemented by separate communication modules. For example, the electronic device may communicate with the external device using the Bluetooth module and communicate with the external server with the Ethernet module or the WiFi module.

The electronic device 100 according to an embodiment of the disclosure may transmit the received digital speech signal and the uttered speech 10 to the speech recognition server. In this case, the speech recognition server may convert the uttered speech 10 into text information using the STT function. In this case, the speech recognition server may transmit the text information to another server or electronic device to perform search corresponding to the text information, and may directly perform search in some cases.

Meanwhile, an electronic device 100 according to another embodiment of the disclosure may directly apply the STT function to the uttered speech 10 and the digital speech signal to obtain the text information. Then, the electronic device 100 itself may identify the second similarity between the text information of the uttered speech 10 and the text information of the wakeup word. As another example, the electronic device 100 may transmit the text information of the uttered speech 10 to the external server and receive an identification result when the external server identifies the second similarity between the text information of the uttered speech 10 and the text information of the wakeup word and transmits the identification result. Here, the external server may be the speech recognition server performing the STT function or may be an external server different from the speech recognition server.

The user interface 140 may be implemented by a device such as a button, a touch pad, a mouse, and a keyboard or may be implemented by a touch screen that may perform both of the abovementioned display function and operation input function. Here, the button may be various types of buttons such as a mechanical button, a touch pad, a wheel, and the like, formed in any region such as a front surface portion, a side surface portion, a back surface portion, and the like, of a body appearance of the electronic device 100.

The input/output interface 150 may be any one of a high definition multimedia interface (HDMI), a mobile high-definition link (MHL), a universal serial bus (USB), a display port (DP), a thunderbolt, a video graphics array (VGA) port, an RGB port, a D-subminiature (D-SUB), or a digital visual interface (DVI).

The input/output interface 150 may input/output at least one of an audio signal or a video signal.

According to an implementation, the input/output interface 150 may include a port inputting/outputting only an audio signal and a port inputting/outputting only a video signal as separate ports, or may be implemented by a single port inputting/outputting both of an audio signal and a video signal.

The electronic device 100 may be implemented by a device that does not include a display to transmit an image signal to a separate display device. As another example, the electronic device 100 may include a display 160, a speaker (not illustrated), and a microphone (not illustrated).

The display 160 may be implemented by various types of displays such as a liquid crystal display (LCD), an organic light emitting diode (OLED) display, a plasma display panel (PDP), and the like. A driving circuit, a backlight unit, and the like, that may be implemented in a form such as an a-si thin film transistor (TFT), a low temperature poly silicon (LTPS), a TFT, an organic TFT (OTFT), and the like, may be included in the display 160. Meanwhile, the display 160 may be implemented by a touch screen combined with a touch sensor, a flexible display, a three-dimensional (3D) display, or the like.

In addition, the display 160 according to an embodiment of the disclosure may include a bezel housing a display panel as well as the display panel outputting an image. Particularly, the bezel according to an embodiment of the disclosure may include a touch sensor (not illustrated) for sensing a user interaction.

The speaker (not illustrated) is a component outputting various notification sounds, an voice message, or the like, as well as various audio data processed by the input/output interface 150.

Meanwhile, the electronic device 100 may further include the microphone (not illustrated). The microphone is a component for receiving a user speech or other sounds and converting the user speech or other sounds into audio data.

The microphone (not illustrated) may receive the user speech in an activated state. For example, the microphone may be formed integrally with an upper side, a front surface, a side surface, or the like, of the electronic device 100. The microphone may include various components such as a microphone collecting a user speech having an analog form, a amplifying circuit amplifying the collected user speech, an A/D converting circuit sampling the amplified user speech to convert the amplified user speech into a digital signal, a filter circuit removing a noise component from the converted digital signal, and the like.

Meanwhile, the electronic device 100 may further include a tuner and a demodulator, according to an implementation.

The tuner (not illustrated) may tune a channel selected by the user among radio frequency (RF) broadcasting signals received through an antenna or all pre-stored channel to receive an RF broadcasting signal.

The demodulator (not illustrated) may receive and demodulate a digital intermediate frequency (DIF) signal and perform channel demodulation, or the like.

Figure 7:
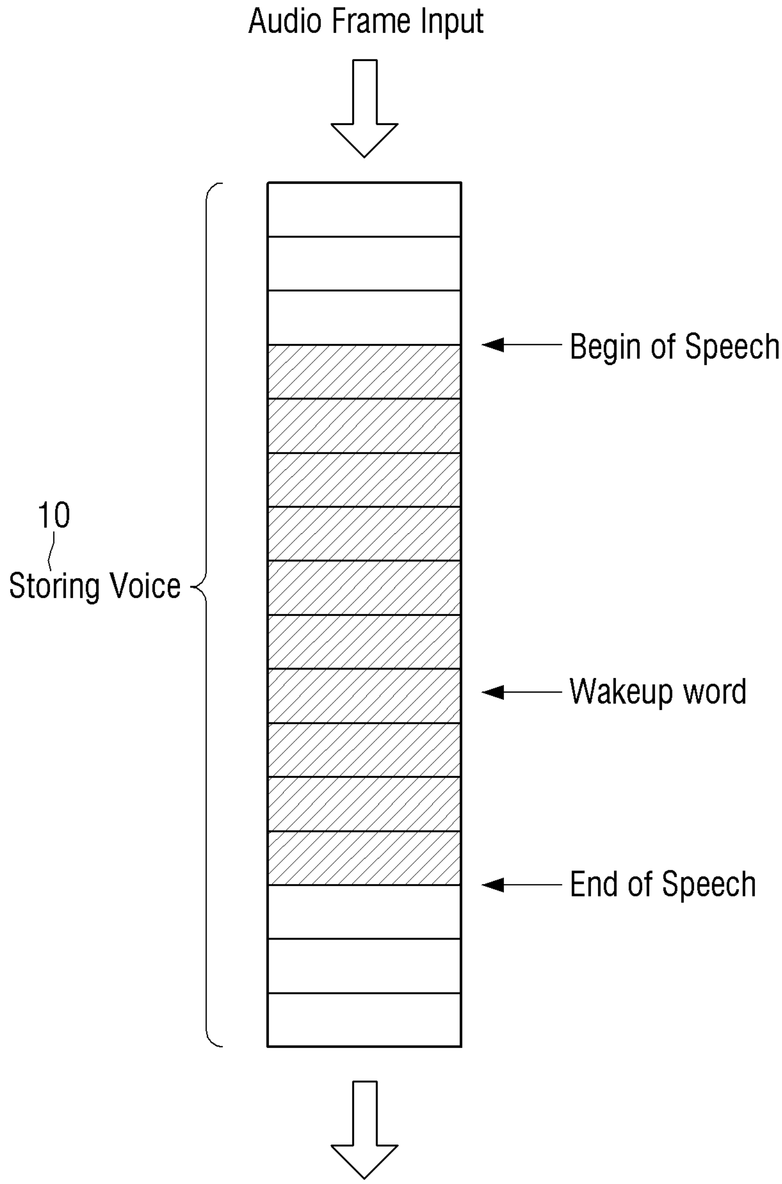
FIG. 7 is a view for describing an uttered speech according to an embodiment of the disclosure.

FIG. 7 is a view for describing an uttered speech according to an embodiment of the disclosure.

The electronic device 100 according to an embodiment of the disclosure may analyze the received uttered speech 10 to obtain characteristic information. Here, the characteristic information may include a frequency change amount of an audio signal included in the uttered speech 10, a length of the audio signal, or pronunciation information of the audio signal. Here, the pronunciation information may include voiceprint characteristics. Here, the voiceprint characteristic refers to user-unique characteristics obtained on the basis of a result of time series decomposition of a frequency distribution for the uttered speech of the user. For example, since oral structures of persons through which the speech comes out are different from individual to individual, the voiceprint characteristic may also be different from individual to individual.

The electronic device 100 according to an embodiment of the disclosure may identify whether or not the received uttered speech 10 corresponds to voiceprint characteristics of a pre-registered user on the basis of the characteristic information. Then, the electronic device 100 may identify a first similarity between the characteristic information of the uttered speech 10 and the recognition related information when it is identified that the received uttered speech 10 corresponds to an uttered speech 10 of the pre-registered user.

As another example, the electronic device 100 may not identify the first similarity when it is identified that the received uttered speech 10 does not correspond to the uttered speech 10 of the pre-registered user. As another example, the electronic device 100 may provide a user interface (UI) guiding registration of a new user. The electronic device 100 may store characteristic information of an uttered speech 10 of the new user in the storage 110 when the new user is registered. Meanwhile, this is only an example, and the disclosure is not limited thereto. For example, the electronic device 100 may not perform a process of identifying whether or not the received uttered speech 10 corresponds to the uttered speech 10 of the pre-registered user on the basis of the characteristic information of the uttered speech 10.

The electronic device 100 according to an embodiment of the disclosure may identify a begin of speech and an end of speech in the uttered speech 10 of the user that is continuously received and store only corresponding portions in the storage 110.

Figure 8:
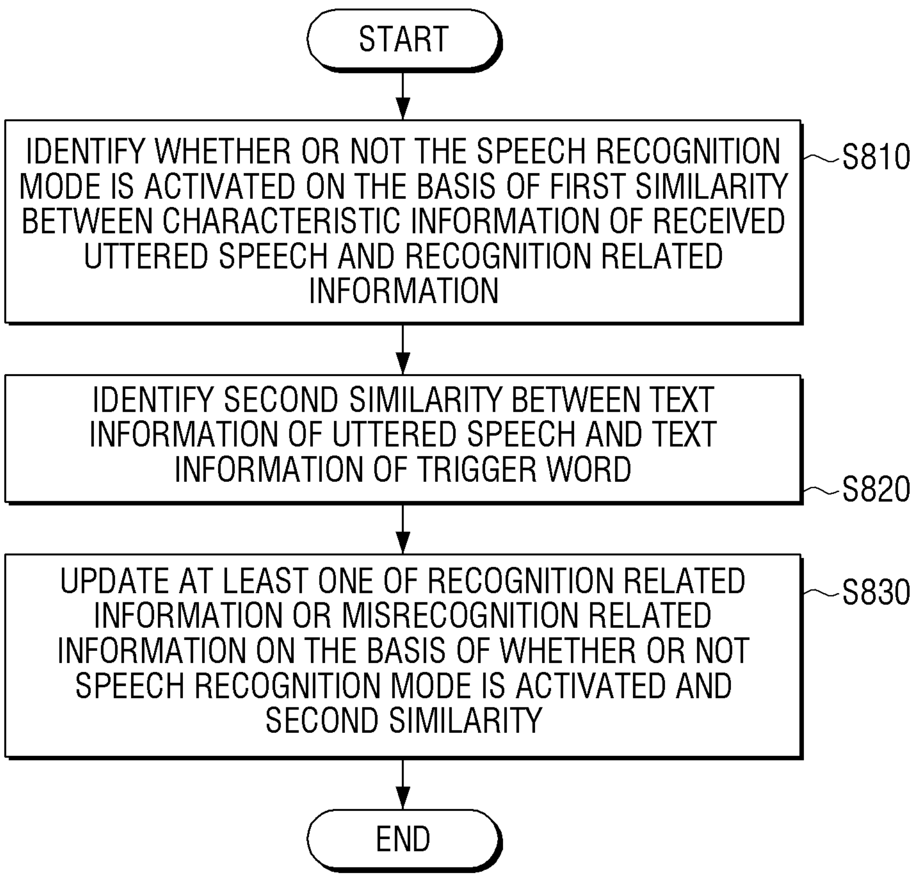
FIG. 8 is a flowchart for describing a control method of an electronic device according to an embodiment of the disclosure.

FIG. 8 is a flowchart for describing a control method of an electronic device according to an embodiment of the disclosure.

In the control method of an electronic device according to an embodiment of the disclosure, when the uttered speech of the user is received, it is identified whether or not the speech recognition mode is activated on the basis of the characteristic information of the uttered speech and the recognition related information (S810).

Then, the similarity between the text information of the uttered speech and the text information of the wakeup word is identified (S820).

Then, at least one of the recognition related information or the misrecognition related information is updated on the basis of whether or not the speech recognition mode is activated and the similarity (S830).

Here, the updating (S830) may include updating the misrecognition related information on the basis of the characteristic information of the uttered speech when the speech recognition mode is activated and the similarity is less than the first threshold value.

In addition, the updating (S830) may include updating the recognition related information on the basis of the characteristic information of the uttered speech when the speech recognition mode is inactivated and the similarity is the first threshold value or more.

The identifying (S810) of whether or not the speech recognition mode is activated may include activating the speech recognition mode when the similarity between the characteristic information of the uttered speech and the recognition related information is the second threshold value or more and the similarity between the characteristic information of the uttered speech and the misrecognition related information is less than the third threshold value.

Here, the recognition related information of the wakeup word may include at least one of the utterance frequency, the utterance length information, or the pronunciation information of the wakeup word, the misrecognition related information of the wakeup word may include at least one of the utterance frequency, the utterance length information, or the pronunciation information of the misrecognized word related to the wakeup word, and the characteristic information of the uttered speech may include at least one of the utterance frequency, the utterance length information, or the pronunciation information of the uttered speech.

The identifying (S820) of the similarity according to an embodiment of the disclosure may include obtaining the similarity on the basis of at least one of the similarity between the number of characters included in the text information of the uttered speech and the number of characters included in the text information of the wakeup word or the similarities between the first character and the last character included in the text information of the uttered speech and the first character and the last character included in the text information of the wakeup word.

The control method according to an embodiment of the disclosure may further include storing the uttered speech in the storage, wherein the identifying (S820) of the similarity includes obtaining the text information corresponding to each of the plurality of uttered speeches and obtaining the similarity between the text information corresponding to each of the plurality of uttered speeches and the text information of the wakeup word when the plurality of uttered speeches are stored in the storage.

The control method according to an embodiment of the disclosure may further include providing the list of the plurality of speech files corresponding to the plurality of uttered speeches and updating the misrecognition related information on the basis of the uttered speech corresponding to a selected speech file when a selection command for one of the plurality of speech files is received.

Figure 9:
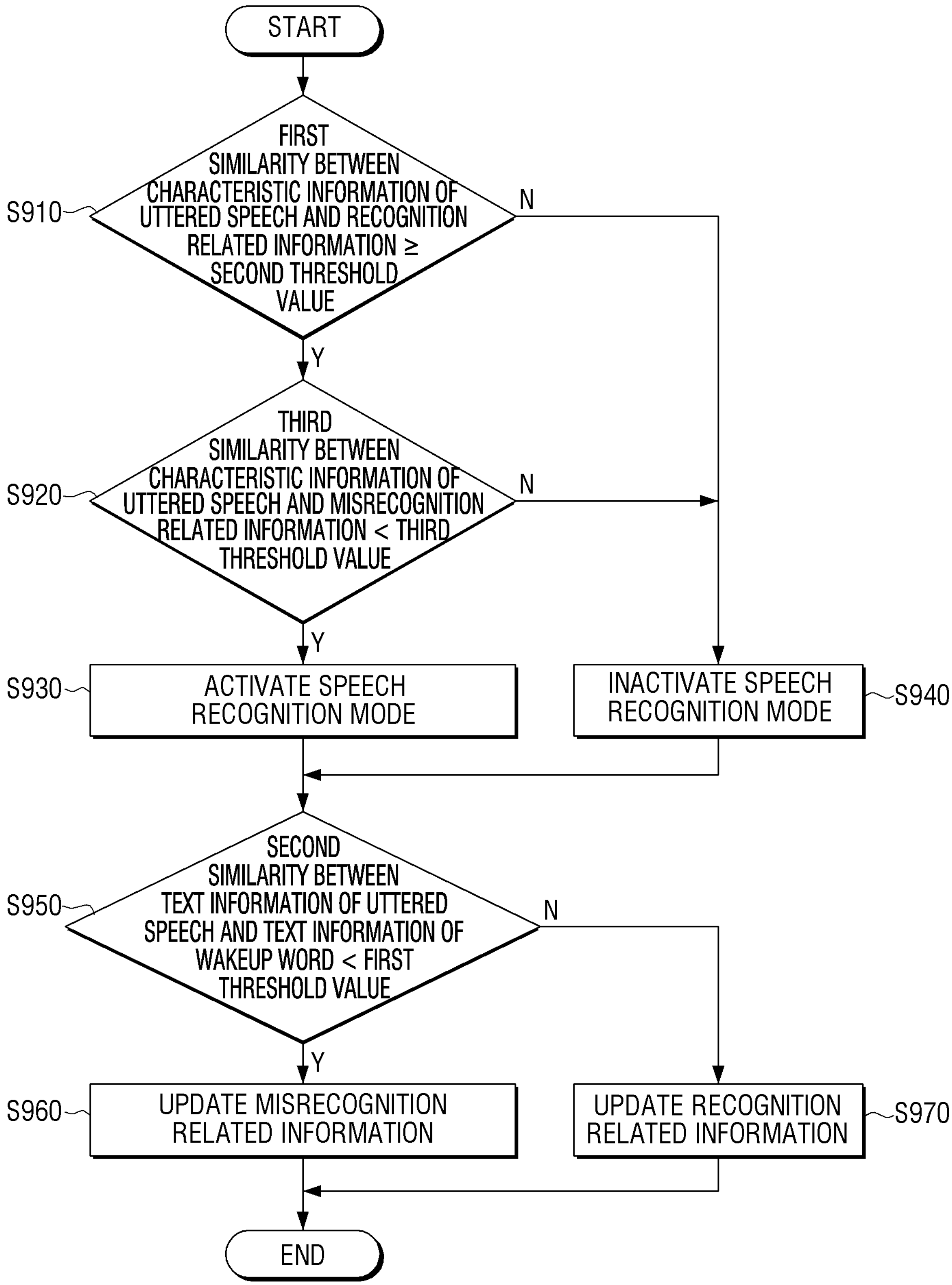
FIG. 9 is a flowchart for describing a method of updating recognition or misrecognition related information according to an embodiment of the disclosure.

FIG. 9 is a flowchart for describing a method of updating recognition or misrecognition related information according to an embodiment of the disclosure.

Referring to FIG. 9, in the control method of an electronic device according to an embodiment of the disclosure, it may be identified whether or not the first similarity between the characteristic information of the received uttered speech and the recognition related information is the second threshold value or more (S910).

When the first similarity is the second threshold value or more (S910: Y), it may be identified whether or not the third similarity between the characteristic information of the uttered speech and the misrecognition related information is less than the third threshold value (S920).

Then, when the third similarity is less than the third threshold value (S920: Y), the speech recognition mode may be activated (S930), and it may be identified whether or not the second similarity between the text information of the uttered speech and the text information of the wakeup word is less than the first threshold value (S950).

Meanwhile, when the first similarity is less than the second threshold value (S910: N) or the third similarity is the third threshold value or more (S920: N), the speech recognition mode may be inactivated (S940), and it may be identified whether or not the second similarity between the text information of the uttered speech and the text information of the wakeup word is less than the first threshold value (S950).

Then, when the speech recognition mode is activated (S930) and the second similarity is less than the first threshold value (S950: Y), the misrecognition related information may be updated (S960).

As another example, when the speech recognition mode is inactivated (S940) and the second similarity is the first threshold value or more (S950: N), the recognition related information may be updated (S970).

Meanwhile, the methods according to the diverse embodiments of the disclosure described above may be implemented in a form of an application that may be installed in an existing electronic device.

In addition, the methods according to the diverse embodiments of the disclosure described above may be implemented only by software upgrade or hardware upgrade for the existing electronic device.

Further, the diverse embodiments of the disclosure described above may also be performed through an embedded server included in the electronic device or an external server of at least one of the electronic device or the display device.

Meanwhile, according to an embodiment of the disclosure, the diverse embodiments described above may be implemented by software including instructions stored in a machine-readable storage medium (for example, a computer-readable storage medium). A machine may be a device that invokes the stored instruction from the storage medium and may be operated depending on the invoked instruction, and may include the electronic device (for example, the electronic device A) according to the disclosed embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

In addition, according to an embodiment of the disclosure, the methods according to the diverse embodiments described above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

In addition, each of components (for example, modules or programs) according to the diverse embodiments described above may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:

a storage storing recognition related information of a trigger word for performing a function corresponding to a voice recognition and misrecognition related information of the trigger word; and a processor configured to:

identify whether a similarity between characteristic information of a received voice input and the recognition related information is above a first threshold value, identify whether a similarity between characteristic information of the received voice input and the misrecognition related information is less than a second threshold value, and perform the function corresponding to a voice recognition based on the similarity between characteristic information of the received voice input and the recognition related information being identified as being above the first threshold value and the similarity between characteristic information of the received voice input and the misrecognition related information being identified as being less than the second threshold value, identify a similarity between text information of the received voice input and text information of the trigger word, and update at least one of the recognition related information and the misrecognition related information based on the similarity between text information of the received voice input and text information of the trigger word.

2. The electronic device as claimed in claim 1, wherein, based on the similarity between text information of the received voice input and text information of the trigger word being less than a third threshold value, the updating updates the misrecognition related information.

3. The electronic device as claimed in claim 1, wherein the processor is further configured to update the misrecognition related information based on the electronic device being switched from a general mode to a speech recognition mode and the similarity between text information of the received voice input and text information of the trigger word being less than a third threshold value.

4. The electronic device as claimed in claim 1, wherein the processor is further configured to:

inactivate the function corresponding to a voice recognition based on the similarity between characteristic information of the received voice input and the recognition related information being identified as not being above the first threshold value, or the similarity between characteristic information of the received voice input and the misrecognition related information being identified as not being less than the second threshold value, and update at least one of the recognition related information and the misrecognition related information based on the similarity between text information of the received voice input and text information of the trigger word.

5. The electronic device as claimed in claim 1, wherein the recognition related information includes at least one of an utterance frequency, utterance length information, and pronunciation information, of the trigger word, the misrecognition related information includes at least one of an utterance frequency, utterance length information, and pronunciation information, of a misrecognized word related to the trigger word, and the characteristic information of the uttered speech includes at least one of a utterance frequency, utterance length information, and pronunciation information, of the voice input.

6. The electronic device as claimed in claim 1, wherein the processor is configured to obtain the similarity between text information of the received voice input and text information of the trigger word based on at least one of a similarity between a number of characters included in the text information of the received voice input and a number of characters included in the text information of the trigger word, or similarities between a first character and a last character included in the text information of the received voice input and a first character and a last character included in the text information of the trigger word.

7. The electronic device as claimed in claim 1, wherein the processor is configured to:

obtain text information corresponding to each of a plurality of voice inputs, and obtain a similarity between the text information corresponding to each of the plurality of voice inputs and the text information of the trigger word.

8. The electronic device as claimed in claim 7, further comprising:

a display, wherein the processor is configured to:

provide, through the display, a list of a plurality of speech files corresponding to the plurality of voice inputs, and in response to a selection command to select a speech file of the plurality of speech files being received, the update of the at least one of the recognition related information and the misrecognition related information updates the misrecognition related information based on a voice input corresponding to the selected speech file.

9. A method comprising:

by an electronic device, identifying whether a similarity between characteristic information of a received voice input and recognition related information of a trigger word for performing a function corresponding to a voice recognition is above a first threshold value;

identifying whether a similarity between characteristic information of the received voice input and misrecognition related information of the trigger word is less than a second threshold value, performing the function corresponding to a voice recognition based on both the similarity between characteristic information of the received voice input and the recognition related information being identified as being above the first threshold value, and the similarity between characteristic information of the received voice input and the misrecognition related information being identified as being less than the second threshold value, identifying a similarity between text information of the received voice input and text information of the trigger word; and updating at least one of the recognition related information and the misrecognition related information based on a similarity between text information of the received voice input and text information of the trigger word.

10. The method as claimed in claim 9, wherein, based on the similarity between text information of the received voice input and text information of the trigger word being less than a third threshold value, the updating updates the misrecognition related information.

11. The method as claimed in claim 9, further comprising:

by the electronic device, updating the misrecognition related information based on the electronic device being switched from a general mode to a speech recognition mode and the similarity between text information of the received voice input and text information of the trigger word being less than a third threshold value.

12. The method as claimed in claim 9, further comprising:

inactivating the function corresponding to a voice recognition based on the similarity between characteristic information of the received voice input and the recognition related information being identified as not being above the first threshold value, or the similarity between characteristic information of the received voice input and the misrecognition related information being identified as not being less than the second threshold value, and the updating updates the recognition related information.

13. The method as claimed in claim 9, wherein the recognition related information includes at least one of an utterance frequency, utterance length information, and pronunciation information, of the trigger word, the misrecognition related information includes at least one of an utterance frequency, utterance length information, and pronunciation information, of a misrecognized word related to the trigger word, and the characteristic information of the voice input includes at least one of a utterance frequency, utterance length information, and pronunciation information, of the voice input.

14. The method as claimed in claim 9, further comprising:

by the electronic device, obtaining the similarity between text information of the received voice input and text information of the trigger word based on at least one of a similarity between a number of characters included in the text information of the received voice input and a number of characters included in the text information of the trigger word, and similarities between a first character and a last character included in the text information of the received voice input and a first character and a last character included in the text information of the trigger word.

15. The method as claimed in claim 9, further comprising:

by the electronic device, obtaining text information corresponding to each of a plurality of voice inputs, and obtaining a similarity between the text information corresponding to each of the plurality of voice inputs and the text information of the trigger word.

16. The method as claimed in claim 15, further comprising:

by the electronic apparatus, providing a list of a plurality of speech files corresponding to the plurality of voice inputs; and in response to a selection command to select a speech file of the plurality of speech files being received, the updating updates at least one of the recognition related information and the misrecognition related information based on a voice input corresponding to the selected speech file.

17. A non-transitory computer-readable medium storing computer-readable instructions that, when executed by a processor of an electronic device, causes the electronic device to perform a process including:

identifying whether a similarity between characteristic information of a voice input and recognition related information of a trigger word is above a first threshold value;

identifying whether a similarity between characteristic information of the voice input and misrecognition related information of the trigger word is less than a second threshold value;

performing the function corresponding to a voice recognition based on both the similarity between characteristic information of the received voice input and the recognition related information being identified as being above the first threshold value, and the similarity between characteristic information of the received voice input and the misrecognition related information being identified as being less than the second threshold value;

identifying a similarity between text information of the voice input and text information of the trigger word; and updating at least one of the recognition related information and the misrecognition related information based on the similarity between text information of the voice input and text information of the trigger word.

* * * * *